(12) United States Patent
Adamy et al.

(10) Patent No.: US 9,010,273 B2
(45) Date of Patent: Apr. 21, 2015

(54) ABSORBENT COMPOSITION FOR MITIGATING FECAL ODOR

(75) Inventors: Steven T. Adamy, Lawrenceville, NJ (US); Lauren Ciemnolonski, Princeton, NJ (US); Frederick Lawson, Somerset, NJ (US)

(73) Assignee: Church & Dwight Co., Inc., Princeton, NJ (US)

( * ) Notice: Subject to any disclaimer, the term of this patent is extended or adjusted under 35 U.S.C. 154(b) by 631 days.

(21) Appl. No.: 12/896,569

(22) Filed: Oct. 1, 2010

(65) Prior Publication Data

US 2012/0079989 A1 Apr. 5, 2012

(51) Int. Cl.
A01K 29/00 (2006.01)
B01J 20/00 (2006.01)
A01K 1/015 (2006.01)

(52) U.S. Cl.
CPC ............ *A01K 1/0152* (2013.01); *A01K 1/0154* (2013.01); *Y10S 502/526* (2013.01)

(58) Field of Classification Search
CPC ........................ A01K 1/0154; A01K 1/0155
USPC ............... 502/400, 407, 414, 415, 411, 526; 119/171, 173
See application file for complete search history.

(56) References Cited

U.S. PATENT DOCUMENTS

| | | | |
|---|---|---|---|
| 4,405,354 A | | 9/1983 | Thomas, II et al. |
| 6,110,479 A * | | 8/2000 | Blaney et al. ............ 424/402 |
| 6,280,495 B1 | | 8/2001 | Doetsch et al. |
| 7,331,309 B2 | | 2/2008 | Burckbuchler, Jr. |
| 7,393,521 B2 | | 7/2008 | Hruza |
| 7,419,593 B2 * | | 9/2008 | Trauger et al. ............ 210/502.1 |
| 7,468,469 B2 | | 12/2008 | Hollabaugh et al. |
| 7,603,964 B2 | | 10/2009 | Jenkins et al. |
| 7,665,418 B2 | | 2/2010 | Bracilovic |
| 2002/0102229 A1 | | 8/2002 | Wegner |
| 2006/0088498 A1 | | 4/2006 | Martin et al. |
| 2008/0223302 A1 | | 9/2008 | Wang et al. |
| 2009/0069181 A1 | | 3/2009 | Boulos |
| 2009/0169630 A1 | | 7/2009 | Ward et al. |

FOREIGN PATENT DOCUMENTS

| | | |
|---|---|---|
| DE | 4101243 A1 | 7/1992 |
| DE | 4101243 A1 * | 7/1992 |
| WO | WO00/53001 | 9/2000 |

OTHER PUBLICATIONS

Print out of the search results and definition of the chemical compound known as silicic acid, as cited in the Encyclopaedia Britannica website (http://www.britannica.com/EBchecked/topic/544289/silicic-acid) and last updated as of Sep. 18, 2013.

* cited by examiner

*Primary Examiner* — Anthony J Zimmer
(74) *Attorney, Agent, or Firm* — Fishman & Associates, LLC; Jai-Wei Fishman

(57) ABSTRACT

The present invention is directed towards an absorbent composition and its method of production and use. More specifically, the present invention relates to an absorbent composition comprising a liquid absorbing material, at least one alkaline earth metal peroxide, and an acidic material. The acid maintains a high hydrogen peroxide release profile under acidic conditions, such that the composition is found surprisingly effective in mitigating fecal odor.

19 Claims, 2 Drawing Sheets

ABSORBENT COMPOSITION FOR MITIGATING FECAL ODOR

FIELD OF THE INVENTION

The present invention relates to an absorbent composition and its method of production and use. Particularly, the present invention relates to an absorbent composition comprising a liquid absorbing material, at least one alkaline earth metal peroxide and an acidic material, wherein the composition is found surprisingly effective in mitigating fecal odor.

BACKGROUND OF THE INVENTION

Before the advent of litters, pet owners had relegated pets to outside the home for lack of an area for taking care of pet excrement. Litters allow pets to take care of waste functions and live inside the home. Housebroken animals, such as cats, are trained into the habit of urinating and defecating in a specially provided litter box. Similarly, untrained and caged animals, such as guinea pigs, urinate and defecate on the floor of their cage, often in approximately the same floor area of the cage. Consequently, pet owners, homeowners, veterinarians and laboratory personnel have added liquid absorbing materials to the litter box or cage to collect the urine and feces.

The most commonly used litter box liquid absorbing materials are inexpensive clays, such as calcined clays, that are safe and non-irritating to the animals, and that absorb substantial amounts of liquids. Other porous, solid litter box absorbent materials, that are used alone or in combination, include straw, sawdust, wood chips, wood shavings, porous polymeric beads, shredded paper, sand, bark, cloth, ground corn husks, and cellulose. Each of these absorbent materials has the advantage of low cost. The entire contents of the litter box including the soiled and unsoiled liquid absorbing materials will eventually be removed, because of the offensive odor caused by the absorbed urine and feces.

Many litters adequately control the odor associated with urine. This is typically done through simple absorption of liquid, which counteracts the growth of odor-causing bacteria. Currently clay soils or comminuted rocks, e.g. the sodium bentonites, are used to improve litter compositions. Sodium bentonites not only absorb liquid waste such as urine, but they also absorb the odor associated with the liquid waste, as the material binds amine compounds in the 'face sites" of the clay interlayers.

However, clay litters composed of sodium bentonites or other materials do not address the issue of fecal odor. Fecal odor differs from urine odor in that the odor is produced immediately at the time of the defecation, whereas urine odor, being produced by the action of microbes, evolves in the days following urination. Materials in fecal odor that carry an especially strong impact include butyric acid, p-cresol, skatole, and dimethyltrisulfide.

DESCRIPTION OF THE PRIOR ART

A variety of methods and compositions have been described in the prior art for preparing animal litter to combat offensive odor. One such example is U.S. Pat. No. 4,405,354 to Thomas II, et al., describing a method for controlling ammonia odor from organic waste by monobasic salts of dibasic acids, and mono-, di- or tri-basic acids, such that the acid has a dissociation constant $pK_a$ less than the corresponding dissociation constant of aqueous ammonia.

Another example is WO2000/53001 to Simmler-Hübenthal et al., disclosing an animal litter containing thyme camphor and/or at least one solid peroxo compound to reduce smells.

Another example is U.S. Application No. 2006/0088498 to Martin et al., describing a solvent activated antimicrobial oxidizing agent comprising a reactor such as magnesium peroxide and/or calcium peroxide within a reactor core for treating animal litter, and that such oxidizing agent may be used to eliminate odor related to microbes on ice in ice machines. However the composition of Martin et al. requires a reactor wall such as a porous membrane to control the release of solvent to the reactants and the diffusion of the oxidizing agent.

SUMMARY OF THE INVENTION

An absorbent composition comprising a liquid absorbing material, and a combination of at least one alkaline earth metal peroxide and an acidic material selected from citric acid, zinc chloride and malic acid, has been found surprisingly effective in mitigating fecal odor. The liquid absorbing material is a clumping or non-clumping material known in the art.

BRIEF DESCRIPTION OF THE DRAWINGS

For a fuller understanding of the nature and advantages of the present invention, reference should be made to the following detailed description read in the conjunction with the accompanying drawings.

DETAILED DESCRIPTION OF THE INVENTION

Figure 1:
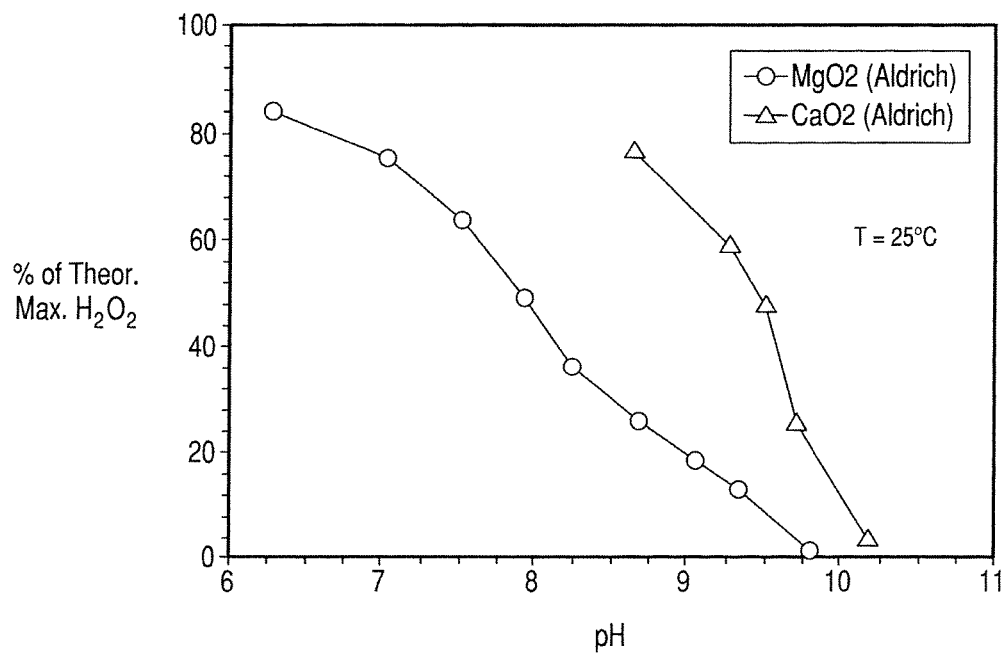
FIG. 1. Illustrates the percentage of hydrogen peroxide release from magnesium peroxide and calcium peroxide at pH range of 6 to 11.

An absorbent composition for mitigating fecal odor comprises a liquid absorbing material and a combination of at least one alkaline earth metal peroxide and an acidic material selected from citric acid, zinc chloride, and malic acid. The liquid absorbing material can be clumping or non-clumping, such as natural clumping clays, e.g. sodium bentonite, non-clumping clays, non-clumping clays combined with clumping agents, non-clay materials or non-clay materials combined with clumping agents, or any mixture of the above materials.

Liquid Absorbing Material

Commonly used liquid absorbing material for animal litters are clays. The water-absorbent clay component of the animal litters of this invention may be, for example, a clay soil or comminuted rock containing at least one water swellable clay mineral. Such clay mineral may be, for example, a montmorillonoid or smectite, having a three-layer, sheet structure crystal lattice with two layers of silicon/oxygen tetrahedrons between which is a central layer of aluminum and/or magnesium/oxygen dioctahedrons or trioctahedrons. Part of the silicon in the tetrahedral layers may be substituted with aluminum and part of the aluminum and/or magnesium in the central octahedral layer may be substituted with other elements such as lithium, chromium, zinc, or iron. Contemplated montmorillonoid clay minerals are montmorillonite and nontronite containing a dioctahedral central layer, and hectorite, saponite, and sauconite containing a trioctohedral central layer.

When the foregoing montmorillonoid clay minerals are contacted with water or water vapor, the water molecules penetrate between the layers causing interlayer or intracrystalline swelling and expansion of the entire lattice. This causes the particles of clay component in the animal litter to agglomerate thus facilitating the removal of only that portion of the litter, which is swelled by urine or other aqueous waste liquid.

The often-used clay component of the animal litter of the present invention is a comminuted bentonite, more preferably a sodium bentonite, which contains a preponderant amount of montmorillonite clay mineral. The use of bentonite clays in a variety of applications, such as a component in drilling muds, is well known. Bentonites are economical, readily available clays, with certain forms capable of hydrating and swelling in the presence of water. The swelling properties of bentonite are related to the exchangeable cations present in a particular bentonite ore. The water-swellable bentonite clays contain various exchangeable cations, including sodium, potassium, lithium, ammonium, calcium and magnesium. Although any of these cations can be the predominant exchangeable cation of the bentonite clay of the present invention, bentonite clays often include a variety of exchangeable cations.

The water-swellable bentonite clays useful in the fecal odor absorbent composition of the present invention include any water-swellable bentonite clay that hydrate in the presence of water, e.g., swell in the presence of water. The water-swellable bentonite clay is selected from the group consisting of sodium bentonite, potassium bentonite, lithium bentonite, calcium bentonite and magnesium bentonite, or combination thereof. The bentonite clay can be any member of the dioctahedral or trioctahedral smectite group, or a mixture thereof; examples include Montmorillonite, Beidellite, Nontronite, Hectorite and Saponite, or combinations thereof.

Clays dominate the animal litter market. However, the naturally clumping clays are not the only sorts of water absorbing material useful in the litter. As mentioned above, other water absorbing material may be used as litter such as non-clumping clays, which may or may not be converted to clumping clays with the addition of clumping agents.

These non-clumping clays include Attapulgite, Fuller's earth, calcium bentonite, palygorskite and sepiolite. The Fuller's earth clay, also referred to herein as Fuller's earth or clay, constituent of the compositions of this invention is a natural, earthy material composed primarily of hydrous aluminum silicates, while small amounts of non-clay materials can also be present. Calcium bentonites can range in color from a cream, off-white to a dark reddish tan color and are frequently referred to in the trade under designations such as Mississippi Brown and Miss. White. These animal titter clays can be divided into heavy weight clays and lightweight clays. Fuller's earth and calcium bentonite are heavy weight clays. Sepiolite and attapulgite (palygorskite) are lightweight clays.

Other clays useful as the liquid absorbing material in the litter of this invention may include kaolinite, illite, halloysite, hormite, vermiculite or mixtures thereof.

With the large part of the animal litter market being dominated by clumping and non-clumping clays, the remainder of the market is made up of a variety of nonclay substances. Examples of non-clay materials that can be used in the present invention and may or may not be treated with clumping agents include zeolites, crushed stone (like dolomite), light density aggregates and silica gels. It should be noted that clumping clays, such as sodium bentonite, might feasibly be mixed with any of the above materials to form a water absorbing material.

Still other liquid absorbing materials may be made of suitable organic based litter. These natural products include, and are not limited to, such materials as wood based materials such as wood chips, wood shavings, wood flour, sawdust; straw; clay; porous beads such as those of polyethylene, polypropylene or polystyrene; paper based materials such as shredded paper; cloth; alfalfa; cotton; sand; bark; ground corn husks; ground sugar cane; lignocellulose; cellulose; calcium silicate; calcium sulfate; various grains (corn, wheat, flax etc.); or cellulosic products such as sawdust, woodchips or plant hulls.

Clumping Agent

Clumping agents, or clump enhancing materials, may be used in connection with the present invention and those are known in the art such as clumping clays, polysaccharides, water-soluble gums, dry particulate cellulosic ethers and water absorbent polymers, or mixture thereof. Clumping agents promote adhesion of the fine size particles of litter substrates to each other as well as promoting adhesion of the granules to form agglomerate when wetted. Preferably, the clumping agent allows the formation of gelled agglomerate when exposed to a liquid, such as animal urine.

Natural occurring polymers which may be used in connection with the present invention include, for instance, gum arabic, gum karaya, gum tragacanth, gum ghatti, guar gum, alginates, carrageenan, pectins, starches, dextran, xanthan gum, gelatin, gluten, cornstarch and dried plants of the Plantago family. An example of a suitable gum-clumping agent is a water-soluble galactomannan gum, such as a guar gum or a locust bean gum, or an ether derivative thereof, that forms a gel upon contact with liquid. Suitable clumping agents of vinyl polymers include polyvinyl alcohol, polyvinyl esters such polyvinyl acetate, polyvinylpyrrolidone, polyvinyloxazolidone, polyvinyl methyloxazolidone, copolymers and mixtures thereof.

Semisynthetic polymers useful as clumping agents in the present invention include cellulose ethers and guar gum derivatives. The cellulose ether can be methylcellulose, hydroxyethyl cellulose, hydroxypropyl cellulose, ethylhydroxyethyl cellulose, methylhydroxypropyl cellulose, carboxymethyl cellulose, hydroxypropylmethylcellulose or mixtures thereof. A combination of various vinyl, natural and semisynthetic polymers can be used as clumping agents in the present invention.

Useful polymers (such as super absorbent polymers) are preferably capable of absorbing many times their own weight of an aqueous fluid such as urine. The formed agglomerates have sufficient mechanical integrity to be conveyed from a litter box as a discrete entity using methods typically used in removing waste product from a litter box such as with implements or manually by hand.

Other useful clumping agents useful in the present invention are commercially available, for example, commercially available cellulose ethers such as methylcellulose A4M and hydroxypropylmethylcellulose J15MS, E15LVP, K4M and K15M, are all available from The Dow Chemical Company. Various starches, including Starch 1500, are available from Colorcon, a division of Berwind Pharmaceutical Services, Inc. As another example, guar gum is available from Aqualon Company.

In addition, filler materials such as limestone, sand, calcite, dolomite, recycled waste materials, zeolites, and gypsum can also be incorporated with the clay materials to reduce the cost of the litter without significantly decreasing the material's performance as a litter.

Alkaline Earth Metal Peroxides

Alkaline earth metal peroxides such as magnesium peroxide or calcium peroxide are incorporated into the absorbent composition, and they are known for bleaching, disinfecting, and deodorizing. The peroxides release hydrogen peroxide ($H_2O_2$) upon contact with a hydrous fluid:

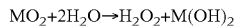

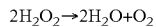

Different alkaline earth metal peroxides have different hydrogen peroxide release profiles. As shown in FIG. 1, Magnesium peroxide (about 26% active $MgO_2$, technical grade, obtained from Aldrich Chemical) displays a lower degree of hydrogen peroxide release at a pH of about pH 8.5 to 10, but a high degree of release (>80%) at about pH 6.3. Meanwhile, calcium peroxide (about 75% active $CaO_2$, technical grade, from Aldrich Chemical) displays a high degree of hydrogen peroxide release (≤80% to 5%) at a pH of about 8.5 to 10, with close to zero or minimal release beyond pH of 10.

Figure 2:
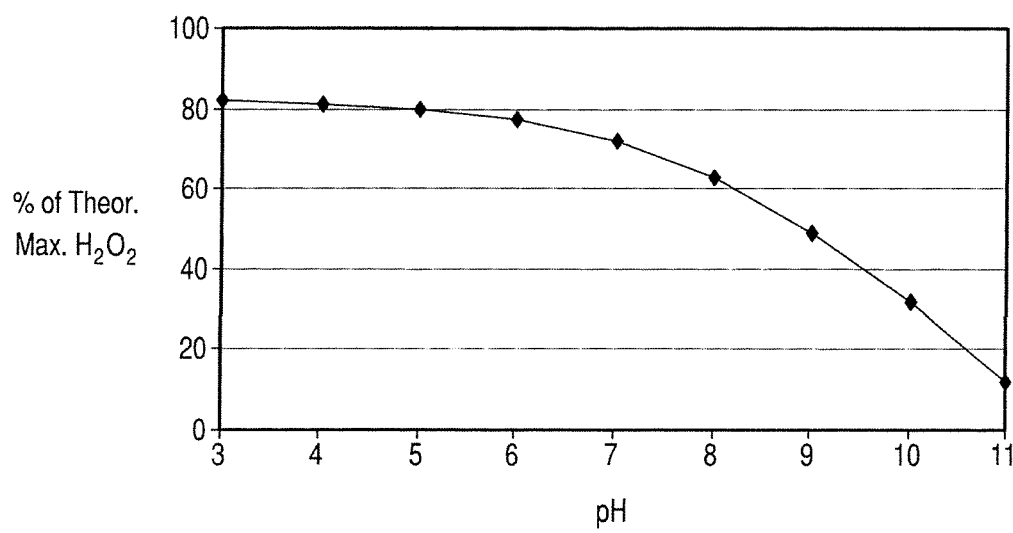
FIG. 2. Illustrates the hydrogen peroxide release profile for a commercial grade (75% active) calcium peroxide at a pH range of 3 to 11.

It can be shown that an alkaline earth metal peroxide with a high degree of release of hydrogen peroxide at a low pH (below about pH 9) is effective in mitigating fecal odor. Therefore it is desirable to lower the pH of the alkaline earth metal peroxide to maximize the release of hydrogen peroxide. Reducing the pH further increases the stability of the $H_2O_2$ that is generated. Furthermore, as illustrated in FIG. 2 that it is possible to maximize the hydrogen peroxide release by lowering the pH of the alkaline earth metal such as calcium peroxide by adding an acidic material. Either powder or granulated alkaline earth metal peroxide can be blended with a liquid absorbing material to produce the absorbent composition. It can be also be shown that a high degree of peroxide release at a high pH (above about pH 9) is not effective in odor mitigation. This may be due to the inherent instability of $H_2O_2$ at high pH. Though peroxide generation can be significant, quick degradation of $H_2O_2$ may render it ineffective against odor compounds.

Although the above discussion is focused on absorbent compositions comprising alkaline earth metal peroxide, it is possible that other inorganic or organic peroxides, or peroxide adducts may also be used as a replacement for or in addition to the alkaline earth metal peroxide. An Example of organic peroxide includes benzoyl peroxide. Examples of inorganic peroxides include barium peroxide and manganese peroxide. An example of a peroxide adduct includes urea peroxide.

Acid

The acidic material suitable for lowering the pH of the alkaline earth metal peroxide can be in the form of either liquid or solid granules. Inorganic acids including Lewis acid or organic acids can be used, i.e. citric acid, zinc chloride and malic acid, and related acids have been found useful. The preferred acid form is a granulated solid and the preferred acid material is citric acid.

Combination of Alkaline Earth Metal Peroxides and an Acidic Material

The acidic material can be incorporated into the absorbent composition by blending the acidic liquid or solid granules with at least one alkaline earth metal peroxide. Spraying the acidic material in liquid form onto the alkaline earth metal peroxide to form a coating may be useful. The acidic material in solid form can also be co-granulated with at least one alkaline earth metal peroxide. Specifically, granules of the two components are mixed and pelleted together, then crushed and sieved to make co-granules of particle size range from greater than 34 microns to less than 2400 microns.

It is believed that the incorporation of the acidic material serves the following purposes: 1) maintains a low local pH in the absorbent composition such that hydrogen peroxide is generated in high percentage to mitigate fecal odor; and 2) ensures the stability of hydrogen peroxide in the low local pH environment. A high release of hydrogen peroxide at a low pH condition is characterized by greater than 50% of hydrogen peroxide release at pH 6.3 or less. A slow release of hydrogen peroxide at a higher pH condition is characterized by no more than 40% of the theoretical maximum of hydrogen peroxide release between about pH 8 and about pH 9.

Formulation

The absorbent composition comprising a liquid absorbing material and at least one alkaline earth metal peroxide are incorporated herein to provide an improved absorbent composition comprising a liquid absorbing material and a combination of at least one alkaline earth metal peroxide and an acidic material.

The liquid absorbing material used in the formulation is in the amount of 50 to 99 Wt. %, also an amount of 50 to 95 Wt. % are useful. The alkaline earth metal peroxide used is present in an amount of from 0.5 to 47.5 Wt. % of the absorbent composition, also the amount of from 0.01 to 49.5 Wt. % are useful. The amount of the acidic material used in the composition is from 0.05 to 25 Wt. % of the absorbent composition, also the amount of from 0.01 to 49.5 Wt. % are useful. The acidic material is preferably co-granulated with at least one alkaline earth metal peroxide. The amount of the co-granules used in the absorbent composition is from about 1 Wt. % to about 50 Wt. %, also the amount of from 5 Wt. % to about 50 Wt. % are useful. The total amount of alkaline earth metal peroxide used to form the co-granules is about 1 to 99%, preferably 50 to 95%, and the amount of acidic material used to form the co-granules is about 1 to 99% preferably 5 to 50%. The ratio of the alkaline earth metal peroxide to the acidic material is from 1:1 to 19:1, preferably 10:1. The ratio of the co-granules to the liquid absorbing material is from 1:99 to 1:1, preferably 1:19.

Optional Components

The absorbent composition optionally includes a filler as described hereinabove, a de-dusting agent and/or fragrance. The de-dusting agent is selected from water-soluble polymeric resins, e.g., polyvinyl alcohol, polyvinyl acetate, polyvinyl pyrrolidone, polyacrylic acid, guar gum, xanthan gum, gum arabic, other natural resins and mixtures of any of these resins. An inorganic dusting agent, such as calcium chloride, can also be used. If a fragrance is utilized, an amount of fragrance in an acceptable range, typically from 0.01-10%, can be employed. The fragrance could be added to the absorbent composition during the process of making the composition or after the absorbent composition is made.

Method of Use

Solid waste such as feces is in full contact with the absorbent composition on at least one surface or phase, with the remaining surface area of the feces covered with at least 10% of the absorbent composition.

The litter compositions of this invention may be used for a wide variety of animals and birds, e.g., un caged household pets such as cats and dogs, particularly puppies too young to be walked, caged pets such as hamsters, gerbils and rabbits, caged laboratory animals such as guinea pigs, mice, rats and monkeys, animals raised for fur such as mink, barnyard birds such as chickens, ducks and geese, and pet birds such as parrots, parakeets, canaries and pigeons. The compositions of this invention are particularly suitable for use as cat litters.

Example 1

A preliminary smell test was conducted to determine the effectiveness of the alkaline earth metal peroxides for mitigating fecal odor. During the test, panelists were asked to smell a large jar containing feces analog (Malodor #1 and #2, simulators of fecal malodor) embedded in litter that contained either magnesium peroxide or calcium peroxide. The panelists subsequently rated the malodor on a scale of 0 (no odor) to 6 (extreme odor). The results are shown below:

| Wt. % of $MgO_2$ (Aldrich Tech. grade) | Malodor | Unscented score (0-6) | | Scented Score (0-6) | |
|---|---|---|---|---|---|
| | | With $MgO_2$ | W/O $MgO_2$ | With $MgO_2$ | W/O $MgO_2$ |
| 2 | 1 | 2.53 | 2.76 | | |
| 2 | 2 | 2.15 | 3.38 | 1.24 | 2.00 |
| 1 | 2 | 2.60 | 3.93 | | |

| Wt. % of $CaO_2$ (Aldrich Tech. grade) | Malodor | Unscented score (0-6) | | Scented Score (0-6) |
|---|---|---|---|---|
| | | With $CaO_2$ | W/O $CaO_2$ | |
| 2 | 2 | 3.65 | 2.76 | Not tested |

It can be shown that magnesium peroxide had superior fecal odor mitigating property as compared to calcium peroxide. Specifically, the panelists consistently smelled less of the malodor (score of 2.15 to 2.60) for the unscented litter at 1 or 2 Wt. % of magnesium peroxide, as compared to 2 Wt. % of calcium peroxide (score of 3.65).

From FIG. 1, it might be expected that the Aldrich technical grade $CaO_2$ would be effective in mitigating fecal odor, since a higher level of peroxide is produced compared to $MgO_2$ at comparable pH values. Surprisingly, this was not the case. Subsequent examples show that the pH-release profile of the MgO2 plot in FIG. 1 appears to be corresponding to improved odor mitigation.

Example 2

A commercial study was conducted by Solvay Chemicals to show that by lowering pH of the metal peroxide, the release of $H_2O_2$ could be altered. In this study, sulfuric acid was added to 0.2% slurry of Ixper®75 C (about 75% active $CaO_2$). A portion of the slurry was filtered and tested for $H_2O_2$ content. Acid was added to remaining slurry to obtain a lower pH. Filtration and analysis were then performed again. The process was repeated to examine $H_2O_2$ over a wide pH range of 3 to 11. Results are illustrated in FIG. 2, where it is shown that peroxide generation was predominant at acidic pH values, leveling off at about pH 5.

Example 3

Procedure for Blending Powder Metal Peroxide into Litter

| Formulation (by weight) |
|---|
| 50% Dolomite/Limestone |
| 2.0% DI Water |
| 0.2% Guar Gum |
| 2.0% Alkaline earth metal peroxide (powder) |
| q.s. Sodium Bentonite (unscented) |
| Total 100% |

In a kitchen-aid mixer, dolomite, water and guar gum were blended together. Alkaline earth metal peroxide powder was added to wet dolomite by gentle mixing to coat the dolomite completely. Sodium bentonite was added to the dolomite blend and gently mixed. Two separate samples were made with the above formulation, each contained 2.0 Wt. % of powder metal peroxide: Ixper® 35M (about 35% active $MgO_2$ from Solvay Chemicals) and Ixper® 75C (about 75% active $CaO_2$). The samples were labeled accordingly as "Sample A" and "Sample B".

Procedure for Blending Granular Metal Peroxide into Litter

| Formulation (by weight): |
|---|
| 5% granular metal peroxide |
| q.s. Sodium bentonite (unscented) |
| Total 100% |

Sodium bentonite and granular metal peroxide were blended together and gently mixed. Two samples were made with the above formulation, each contained a granular metal peroxide: Ixper® 70C (about 70% active $CaO_2$ from Solvay Chemicals) and Ixper® 30M (about 30% active $MgO_2$ from Solvay Chemicals). The samples were labeled accordingly as "Sample C" and "Sample D".

Procedure for Making Co-Granule:

| Formulation |
|---|
| 95.0% Sodium bentonite (unscented) |
| 4.5% Magnesium peroxide |
| 0.5% Citric Acid |
| Total 100% |

10% citric acid, 90% magnesium peroxide by weight were blended and mixed well. A pellet die set was coated with a small amount of magnesium stearate. The citric acid/magnesium peroxide blend was added to the pellet die set (roughly ⅛" thick), and the complete die set was inserted into the Carver Autopellet Lab Press (Model #3887) to pelletize the mixture. The pellets were crushed with a mallet by hand then poured through a series of sieves. The crushed pellets that passed through a U.S. sieve size 8 (smaller than 2.4 mm diameter) and did not pass through a U.S. sieve size 40 (i.e. larger than 0.043 mm diameter) were recovered. The process was repeated until enough granules were made. 95 Wt. % sodium bentonite was blended with 5 Wt. % of the magnesium peroxide/citric acid granules and gently mixed.

Summaries of litter compositions evaluated are shown below:

| Material | Description | Wt. % in litter |
|---|---|---|
| Sample A | 35% Magnesium Peroxide | 2 |
| Sample B | 75% Calcium Peroxide | 2 |
| Sample C | 70% Calcium Peroxide | 5 |
| Sample D | 30% Magnesium Peroxide | 5 |
| $MgO_2$ + Citric acid co-granules | Co-granules of $MgO_2$ and citric acid (%) | 5 |

Each of the unscented litter composition contained a feces model incorporating Malodor #3 (simulator of fecal malodor developed by Church & Dwight) with at least one surface area in full contact with the absorbent composition, and at least 10% of the remaining surface area covered with the absorbent composition. Each litter sample was located in a separated booth with high evacuation. Panelists entered their assigned booths at one panelist per booth, washed their hands with unscented soap and blotted dry. They were then asked to sniff simulated cat feces sample as the reference sample and rated them for odor intensity on a seven-point scale (0=no odor and 6=maximum odor). Each Panelist completed the task once. They assessed the reference sample as a 6 on a 7-point scale.

The Panelists assessed a test sample containing Malodor #3 and rated it for intensity. After waiting for one minute and sniffing an unscented tissue they repeated the process with the second test sample in the appropriate booth. The process was repeated until all five testing samples had been assessed.

All statistical analyses were based on the odor intensity scores. The comparison of the study treatments employed an analysis of variance (ANOVA) model. This ANOVA model included the fixed factor product and the random factor panelist. Post-ANOVA pairwise product comparisons were performed using t-tests. Tukey's method was utilized to adjust for multiple comparisons. All statistical tests of hypotheses were two-sided, and employed a level of significance of $\alpha=0.05$.

Results:

Table 1 provides a summary of the mean scores for each product.

TABLE 1

| Summary of Mean Odor Intensity Scores | | | | | | | | | |
|---|---|---|---|---|---|---|---|---|---|
| | 105 Sample A | | 409 Sample B | | 214 Sample C | | 637 Sample D | | 667 5% Mg Peroxide/ Citric Acid granules |
| N | Mean | SD | Mean | SD | Mean | SD | Mean | SD | Mean | SD |
| 22 | 4.77 | 1.41 | 4.00 | 1.72 | 2.09 | 1.23 | 3.36 | 1.79 | 1.27 | 1.52 |

Table 2 provides p values for significant differences. Products 667 and 214 received the lowest intensity scores and were not significantly different from each other. They were followed by 637, 409 and 105 and were both significantly lower than 637, 409, and 105. Product 637 was significantly lower than Product 105. No other significant differences were detected:

TABLE 2

| Significant Differences and p Values | |
|---|---|
| 667 vs. 105 | p = 0.0001 |
| 667 vs. 409 | p = 0.0001 |
| 667 vs. 637 | p = 0.0001 |
| 214 vs. 105 | p = 0.0001 |
| 214 vs. 409 | p = 0.0002 |
| 214 vs. 637 | p = 0.0240 |
| 637 vs. 105 | p = 0.0240 |

Figure 3:
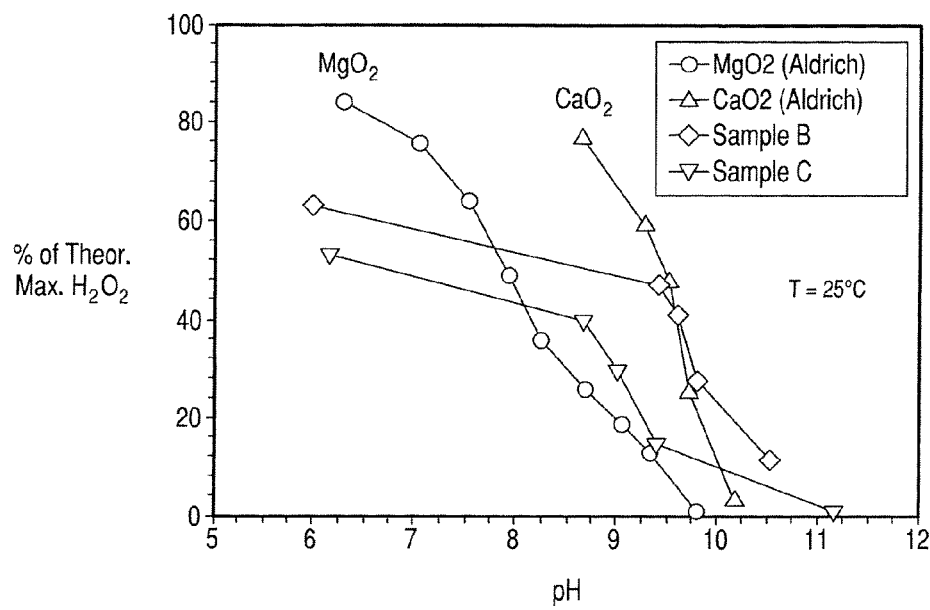
FIG. 3. Compares the hydrogen peroxide release profiles (% of Theor. Max. $H_2O_2$) of various grades of alkaline earth metal peroxides at a pH range of 5 to 12.

In FIG. 3, hydrogen peroxide release profiles of Sample B and Sample C were similar to that of $MgO_2$ (Aldrich). It is believed that by having a similar hydrogen peroxide profile, Sample C performed well in mitigating fecal odor (score of 2.09). Sample B, with a profile similar to that of (Aldrich) $CaO_2$, showed a poor degree of odor mitigation, like the Aldrich $CaO_2$.

Figure 4:
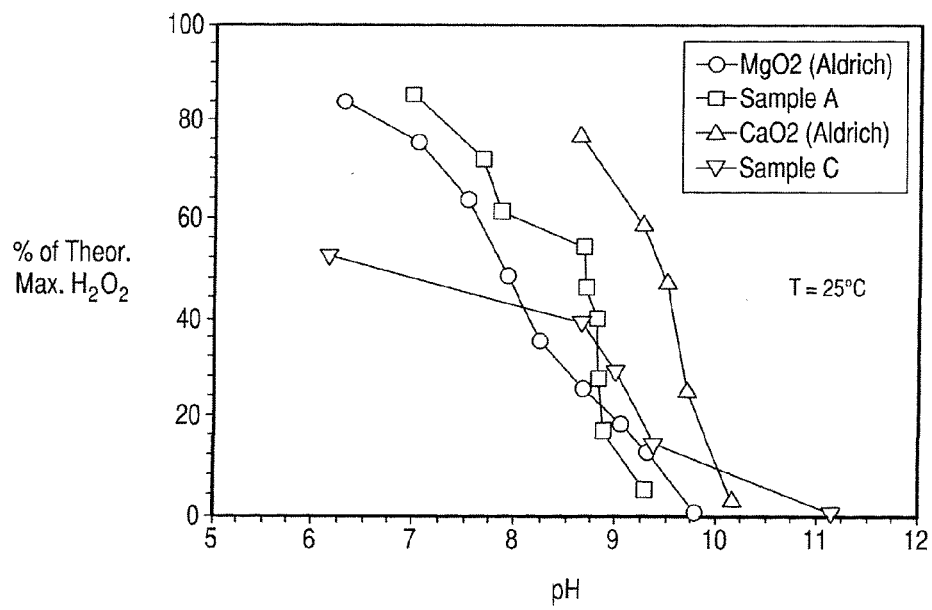
FIG. 4. Compares the hydrogen peroxide release profiles (% of Theor. Max. $H_2O_2$) of various grades of alkaline earth metal peroxide at a pH range of 5 to 12.

Sample D also showed poor performance. In FIG. 4, Sample D had a hydrogen peroxide release that was somewhat steeper than that of the (Aldrich) $MgO_2$. It is believed that the short and steep release of hydrogen peroxide was indicative of properties that contributed to the poor efficacy in attacking strong fecal odor present in the sample (score of 4.77).

It is shown from Table 1 that co-granules of $MgO_2$ with citric acid performed the best to mitigate fecal odor. This was no doubt due to not only an improved efficiency of peroxide release at the lower local pH, but an improved $H_2O_2$ stability due to the lowered pH. Therefore, by lowering the pH of the system with the incorporation of an acid, the hydrogen peroxide release was maximized to best mitigate fecal odor.

What is claimed is:

1. A particulate animal litter composition comprising a liquid absorbing material, and a combination of a co-granule of 1) at least one alkaline earth metal peroxide and 2) an acidic material, wherein said liquid absorbing material forms no part of said combination.

2. The particulate animal litter composition of claim 1, wherein said liquid absorbing material is selected from the group consisting of clumping and non-clumping clay.

3. The particulate animal litter composition of claim 2, wherein said liquid absorbing material is sodium bentonite.

4. The particulate animal litter composition of claim 2, wherein said liquid absorbing material optionally includes a clumping agent.

5. The particulate animal litter composition of claim 4, wherein said liquid absorbing material is selected from the group consisting of kaolinite and attapulgite.

6. The particulate animal litter composition of claim 1, wherein at least one alkaline earth metal peroxide is selected from the group consisting of magnesium peroxide, calcium peroxide and barium peroxide.

7. The particulate animal litter composition of claim 1, wherein said acidic material is selected from the group consisting of citric acid, zinc chloride and malic acid.

8. The particulate animal litter composition of claim 7, wherein said acidic material is citric acid.

9. The particulate animal litter composition of claim 1, wherein the amount of said peroxide used in said composition is from 0.5 to 47.5 Wt. % of said litter composition.

10. The particulate animal litter composition of claim 1, wherein said acidic material is present in the amount of from 0.05 to 25 Wt. % of said litter composition.

11. The particulate animal litter composition of claim 1, wherein said liquid absorbing material is present in the amount of from 50 to 95 Wt. % of said litter composition.

12. The particulate animal litter composition of claim 1, wherein said co-granules of at least one alkaline earth metal peroxide and said acidic material have a particle size of greater than 34 microns and smaller than 2400 microns.

13. The particulate animal litter composition of claim 1, wherein said co-granule has a ratio of said at least one alkaline earth metal peroxide to said acidic material of from 19:1 to 1:1.

14. The particulate animal litter composition of claim 1, wherein said litter composition release greater than 50% of hydrogen peroxide at pH of 6.3 or less.

15. A method to the particulate animal litter composition of claim 1, comprising: 1) mixing an acidic material and least one alkaline earth metal peroxide; 2) pelleting said mixture; 3) crushing then granulating said pellets to a particle size of greater than 34 microns and less than 2400 microns; 4) blending a balance of a liquid absorbing material with said granules to make up a total of 100 Wt. %.

16. The method of claim 15, wherein said composition comprising 0.5 to 47.5 Wt. % of at least one alkaline earth metal peroxide and about 0.05 to 25 Wt. % of an acidic material.

17. The method of claim 15, wherein said at least one alkaline earth metal peroxide is selected from magnesium peroxide and calcium peroxide, and said acid is selected from citric acid, malic acid and zinc chloride.

18. The method of claim 15, wherein said liquid absorbing material is selected from clumping and non-clumping clay.

19. The method of claim 15, wherein the ratio of said at least one alkaline earth metal peroxide to said acidic material is from 19:1 to 1:1.

* * * * *